(12) United States Patent
Gjertsen et al.

(10) Patent No.: US 8,066,804 B2
(45) Date of Patent: Nov. 29, 2011

(54) SCRUBBER

(75) Inventors: Lars Henrick Gjertsen, Jonsvatnet (NO); Arne Olav Fredheim, Trondheim (NO); Carl-Birger Jenssen, Trondheim (NO); Bård Gjøen, Hundhamaren (NO)

(73) Assignee: Statoil ASA, Stavanger (NO)

( * ) Notice: Subject to any disclaimer, the term of this patent is extended or adjusted under 35 U.S.C. 154(b) by 987 days.

(21) Appl. No.: 10/529,857

(22) PCT Filed: Sep. 30, 2003

(86) PCT No.: PCT/NO03/00327
§ 371 (c)(1),
(2), (4) Date: Nov. 17, 2005

(87) PCT Pub. No.: WO2004/030793
PCT Pub. Date: Apr. 15, 2004

(65) Prior Publication Data
US 2006/0117959 A1 Jun. 8, 2006

(30) Foreign Application Priority Data
Oct. 2, 2002 (NO) .................................. 20024729

(51) Int. Cl.
*B01D 47/00* (2006.01)
(52) U.S. Cl. ................. 96/316; 96/321; 96/324
(58) Field of Classification Search .............. 95/216, 95/219; 96/303–308, 314–316, 319–320, 96/216, 219, 324; 422/211, 220, 228
See application file for complete search history.

(56) References Cited

U.S. PATENT DOCUMENTS

| 2,147,671 A | 2/1939 | Pratt |
| 2,364,799 A | 12/1944 | Laughlin et al. |
| 3,495,385 A * | 2/1970 | Glass .............................. 96/306 |

(Continued)

FOREIGN PATENT DOCUMENTS

CA 2025842 3/1992

(Continued)

OTHER PUBLICATIONS

International Search Report issued Dec. 23, 2003 in International (PCT) Application No. PCT/NO03/00327.

(Continued)

*Primary Examiner* — Duane Smith
*Assistant Examiner* — Ives Wu
(74) *Attorney, Agent, or Firm* — Wenderoth, Lind & Ponack, LLP

(57) ABSTRACT

A scrubber for separation of liquid phase and any other constituents from a fluid now that in substance includes a gas. The scrubber is formed as a standing vessel with round cross section, with an outlet for liquid from the bottom and an outlet for gas from the top. The scrubber is distinguished in includes a fluid inlet that either is tangentially oriented relative to the inner wall of the scrubber or equipped with a deflection plate, such that introduced fluid is directed tangentially horizontal or with a small downward slope along the inner wall of the scrubber, into and through a fluid way arranged as a downwards directed spiral within the scrubber, along the inner wall, from a level over or at the inlet to a level at or close to the outlet for liquid, with an opening for gas escape inwards toward the center of the scrubber. The scrubber according to the invention results in very low liquid entrainment.

15 Claims, 2 Drawing Sheets

U.S. PATENT DOCUMENTS

| | | | | |
|---|---|---|---|---|
| 3,507,397 | A | * | 4/1970 | Robinson .................. 210/512.1 |
| 3,792,573 | A | * | 2/1974 | Borsheim ...................... 55/337 |
| 3,850,816 | A | | 11/1974 | Koch |
| 3,988,132 | A | | 10/1976 | Oranje |
| 3,997,303 | A | * | 12/1976 | Newton .......................... 95/284 |
| 4,067,814 | A | | 1/1978 | Surakka et al. |
| 4,498,819 | A | * | 2/1985 | El-Saie ........................ 406/181 |
| 4,537,314 | A | | 8/1985 | Skardal |
| 5,224,976 | A | | 7/1993 | Oranje |
| 5,570,744 | A | * | 11/1996 | Weingarten et al. .......... 166/357 |
| 5,632,962 | A | * | 5/1997 | Baker et al. ................... 422/211 |
| 6,019,825 | A | * | 2/2000 | Greene et al. ................... 96/209 |
| 6,042,628 | A | | 3/2000 | Nishikiori |
| 7,066,207 | B2 | * | 6/2006 | Lane et al. ..................... 137/810 |
| 7,459,001 | B2 | * | 12/2008 | Christiansen et al. .......... 55/343 |

FOREIGN PATENT DOCUMENTS

| | | | |
|---|---|---|---|
| GB | 1119699 | | 7/1968 |
| SE | 435582 | | 10/1984 |
| SE | 0763384 | | 5/2000 |
| SE | 763384 | A * | 5/2000 |
| WO | 97/14489 | | 4/1997 |
| WO | 99/43439 | | 9/1999 |

OTHER PUBLICATIONS

European Office Action issued Dec. 13, 2007 in corresponding European Patent Application No. 1545744.

Norwegian Office Action issued Jul. 29, 2005 corresponding Norwegian Patent Application No. 20024729.

* cited by examiner

SCRUBBER

BACKGROUND OF THE INVENTION

1. Field of the Invention

The present invention regards separation of liquid from gas. In particular, the present invention regards a scrubber with beneficial properties.

2. Description of the Related Art

A number of known installations function to separate fluids of different density by use of a cyclone principle. The principle works by the deflection of a compounded fluid flow for example along the inner wall of a vessel, whereby the heavier constituents move to the outside of the curved fluid flow and are accumulated towards the inner wall of the vessel, after which the heavier constituents as a result of gravitation can be directed to a reservoir or outlet in the bottom of the vessel. The lighter constituents will be concentrated in the center area of the vessel, after which they can be taken out through an outlet beginning in the center area of the vessel.

Some examples of cyclones that can be used for separation of fluids of different density can be found in patent publications NO 308199 and NO 144128, which regard hydrocyclones. The publications teach separation of fluids in the form of liquids, or even liquids with contents of solid constituents, which are fluids of relatively high viscosity. For fluids of high viscosity it is essential to avoid unnecessary pressure loss, which problem is described in the publications.

Pressure loss is also an essential problem with respect to separation of liquids and/or particles from a fluid flow that in substance comprises gas. This is described in patent publication NO 176309, which discloses a device for separation of liquid and/or particles from a high pressure gas flow. In this publication, on page 1, lines 32-38, it is set forth: "The gas density is a very important parameter with respect to the efficiency of a centrifugal gas separator. In general the collection efficiency and also the pressure loss of a centrifugal separator achieve the most preferable values when the flow through the separator is an ideally arranged centrifugal flow on which no other flow such as turbulence and secondary flows have influence."

The device according to NO 176309 comprises a cylindrical vessel with an in substance vertical axis, equipped with: an upper compartment to which gas is fed; an intermediate compartment comprising a number of vanes that are arranged in spiral around the axis; a lower compartment for separation of gas and liquid and/or particles and a coaxial gas outlet pipe extending upwards from the lower compartment through the intermediate compartment and upper compartment, around which spiral formed vanes have been provided; which device is distinguished in that each spiral formed vane is comprising a lower part with a constant slope and a part with a slope that increases gradually in upward direction.

The vanes of the above mentioned device bring the gas into rotation, and the vanes are arranged on the coaxially arranged gas outlet pipe.

In patent publication GB 1119699 an inlet is described that is directed downwards, in contrast to the conventional vane inlet (Schepentoeter) that is directed outwards. The inlets are significant for how the flow is distributed into the scrubber.

Despite devices as those mentioned above, a demand still exists for improvements, in particular with respect to a device that in agreement with the above has most beneficial properties when the flow through the separator is an ideally arranged centrifugal flow on which no other flow such as turbulence and secondary flows have influence. The objective of the present invention is to provide a device that is contributing to meet the above mentioned demand.

SUMMARY OF THE INVENTION

With the present invention a scrubber is provided for separation of liquid phase and any other constituents from a fluid flow that in substance comprises gas. The scrubber is formed as a standing vessel with a round cross-section, with an outlet for liquid from the bottom and an outlet for gas from the top.

The scrubber is distinguished in that it comprises:
a fluid inlet that either is tangentially oriented to the inner wall of the scrubber or equipped with a deflection plate, such that introduced fluid is directed tangentially horizontal or with a small downward slope along the inner wall of the scrubber, into and through a fluid way arranged as a downwards directed spiral within the scrubber, along the inner wall, from a level over or at the inlet to a level at or close to the outlet for liquid, with an opening for permitting gas to escape inwards to the center of the scrubber.

The language "a vertical standing vessel" is intended to mean a vessel with the longitudinal axis oriented vertical or at a small angle from vertical. The language "round cross-section" is intended to mean a vessel with a cross-section that is circular or close to circular, for example elliptical or with other deviation from circular. The language "along the inner wall of the scrubber" is intended to mean on the inner wall of the scrubber or a small distance from the inner wall of the scrubber.

The fluid ways are preferably arranged coaxial with the longitudinal axis of the scrubber.

With the scrubber according to the invention introduced fluid will be passed in a downwards directed spiral course in the fluid way within the scrubber.

With the present invention a device is provided, which in operation to a great extent provides an ideally arranged centrifugal flow on which no other flows such as turbulence and secondary flows have influence. This is achieved in that all fluid deflection can take place on the inner wall of the scrubber and in that the fluid way in substantial degree is providing a shielded laminar flow on which other fluid flows such as turbulence and secondary flows have little influence.

With the scrubber of the invention a good separation of liquid from gas is achieved by rotation/gravitation with minimum generation of turbulence and minimum entrainment of droplets. Further, the accumulation of upstream coalesced liquid is passed relatively unaffected of the gas flow down to the bottom section. The inlet and the fluid way according to the invention are robust with respect to variations in liquid fraction in the feed flow, and result in reduced liquid fraction in the feed to downstream located liquid separation equipment. The result is a good primary liquid separation, with 50 to 75% reduced liquid contents in the gas downstream of the fluid way compared to conventional inlets. The operation of optional devices in the top and bottom of the scrubber, to reduce the liquid ratio further, also becomes more effective.

BRIEF DESCRIPTION OF THE DRAWINGS

The invention is illustrated in the accompanying drawings, more specifically.

DETAILED DESCRIPTION OF THE INVENTION

Figure 1:
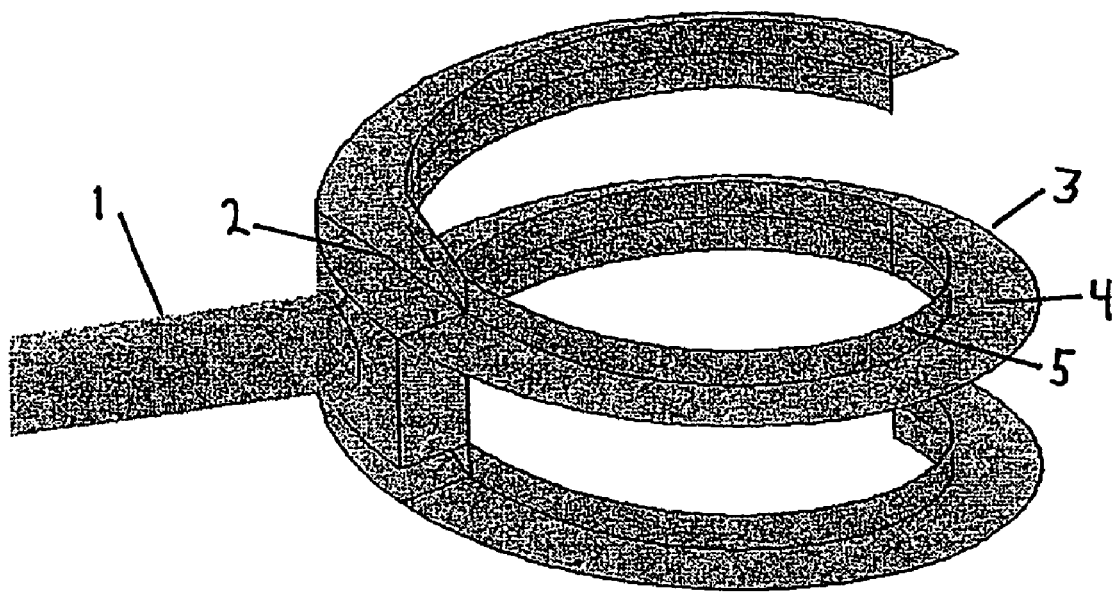
FIG. 1 illustrates an embodiment of the scrubber according to the present invention, more specific the distinguishing parts thereof.

With reference to FIG. 1, a typical embodiment of the distinguishing features of the scrubber according to the present invention is illustrated, more specifically a fluid inlet and a fluid way. The inlet 1 directs the fluid flow towards a deflection plate 2 which again directs the fluid flow into a fluid way 3. The fluid way consists of a guiding plate 4 and an upwardly extending edge 5 fastened along the inner edge of the guiding plate towards the center of the scrubber.

The scrubber according to the invention preferably comprises a fluid way in the form of a guiding plate that is fastened on the inner wall of the scrubber in spiral form from a level above the inlet to a level just above the outlet for liquid. The guiding plate extends out towards the center axis of the scrubber a distance from 5% to 20% of the inner diameter of the scrubber and is equipped with an upwards extending edge of height 75-150% of the width of the guiding plate closest towards the center of the scrubber.

The width of the fluid way preferably covers 5-20% of the inner diameter, because a larger coverage results in higher local vertical gas velocities, with an increased tendency to entrainment of droplets, while a lower coverage results in lower capacity. The limits can be exceeded, but according to the above do not represent preferred embodiments.

The upwards extending edge is preferably parallel to a virtual coaxially arranged cylinder within the scrubber and functions to collect and direct liquid downwards into the scrubber and to hinder or minimize entrainment of liquid upwards in the scrubber with the gas flow.

The inlet can preferably be tangential and with the same slope as the fluid way, whereby it can be achieved that all fluid deflection can take place against the inner wall of the scrubber or fluid way.

In a preferred embodiment of the scrubber according to the invention, the fluid way is a guiding plate that on the inner wall of the scrubber is fastened in spiral form 1-2 revolutions from the top of the scrubber somewhat above a centered inlet with a deflection plate to a level somewhat above the liquid phase in the bottom of the scrubber. The guiding plate has uniform slope and extends 10% of the inner diameter of the scrubber from the wall and is equipped with a middle adjusted fastened upwards extending edge with a height that is equal to the width of the guiding plate closest towards the center of the scrubber.

The spiral has preferably 1-2 revolutions to limit the height of the scrubber, but with respect to effect more revolutions can be provided. The slope of the spiral is typically 10% downwards from the horizontal, but the slope can be varied. For a typical scrubber with an inner diameter of 400 mm, a typical vertical height between each spiral revolution will be 150 mm.

The fluid way preferably comprises a spiral formed pipe placed within the scrubber. The spiral formed pipe in the top of the scrubber is oriented in direct elongation from a tangential inlet and extends to just above the outlet in the bottom of the scrubber, and the spiral formed pipe in all its length has a longitudinal or several closely spaced openings for gas escape. This embodiment is in particular preferable with respect to fabrication.

The scrubber can preferably be formed as a truncated opposite cone where a spiral formed fluid way in the form of a longitudinally open pipe with spiral wound adapted to the form of the scrubber has been introduced. Thereby a gradually increasing deflection of the fluid flow is achieved and thereby a gradually increasing liquid separation is realized.

A vortex breaker is preferably arranged above the outlet of the scrubber. Thereby liquid can flow freely from the vortex breaker down to the liquid that is to be kept in the bottom of the scrubber, while gas can rise upwards to the gas outlet in the top of the scrubber. The vortex breaker can have different known designs, of which two examples are guiding plates breaking the spiral flow and a so called China hat, respectively.

The fluid way can in downward direction preferably have an increasing slope. Thereby, an increasing ratio of liquid can more easily be directed downwards to the bottom of the scrubber.

The fluid way can, in the downward direction, have an increasing opening for gas escape. This can be preferable for achieving a high liquid ratio in the fluid flow at the bottom of the fluid way and to avoid that gas already being relatively dry is mixed with liquid in an optional vortex breaker and therefore is entraining liquid.

The scrubber according to the present invention can have more embodiments than the above mentioned. For example the number of rotations in the fluid way can be significantly larger than two, for example five or at maximum as many as still provide liquid separation. The scrubber can further, for example, be designed as a spiral in a downwards directed pipe, around which spiral a vessel is constructed with an outlet for gas in the top and an outlet for liquid in the bottom. The scrubber can contain more equipment than mentioned above. For example equipment for demisting can be arranged in the top of the scrubber, such as thread grids (mesh), cyclones and/or vanes, which can be of known types or of new types. The fluid way is arranged between optional equipment for demisting in the top of the scrubber and optional equipment for vortex breaking in the bottom of the scrubber. Further equipment in the scrubber according to the invention may comprise, for example, instrumentation.

Particularly preferable, the scrubber has a fluid way that is completely closed for gas escape at the upper end at the inlet, but is gradually opened for escape of gas towards the outlet, and the fluid way has about five revolutions in total, which embodiment appears to be the most preferred one in general because of lowest remaining demand for demisting.

Figure 2:
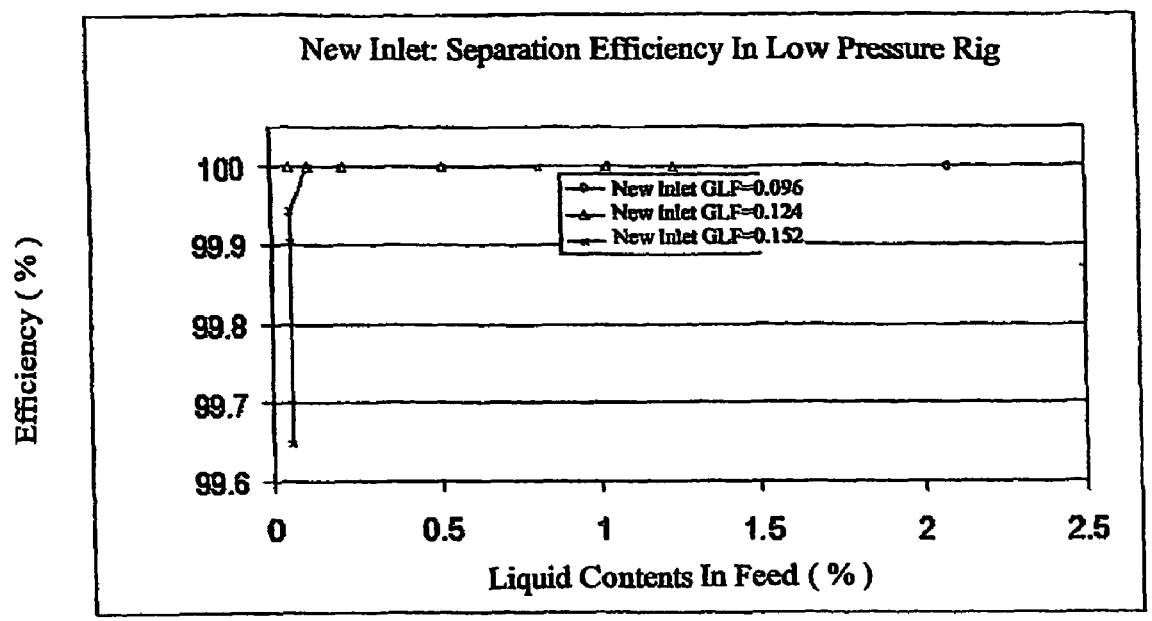
FIG. 2 and FIG. 3 present experimental data in a graphical form.
Figure 3:
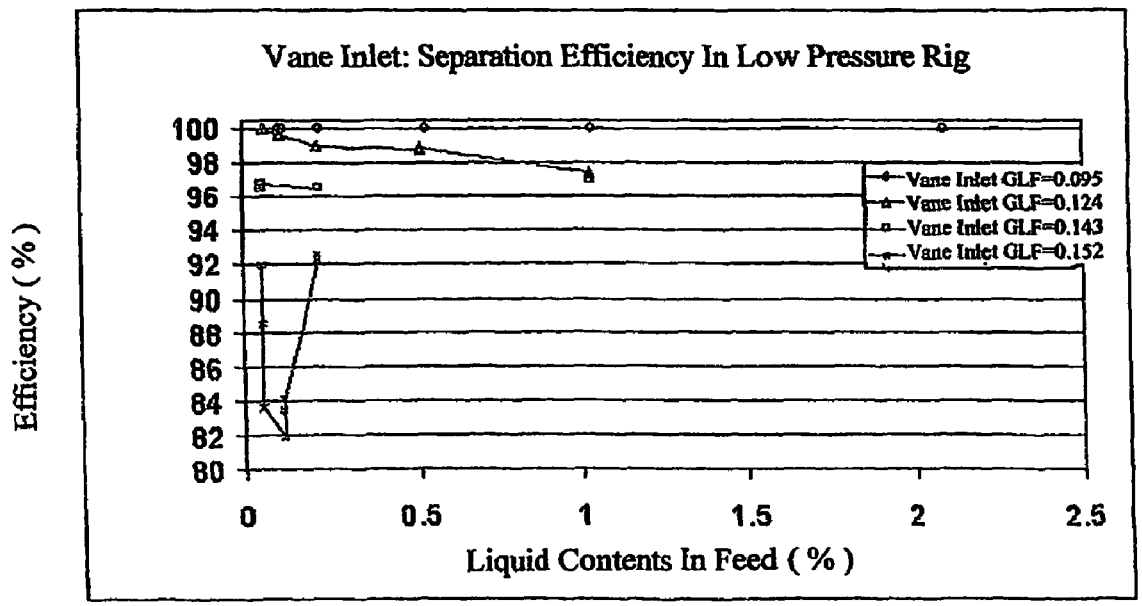

An experiment was conducted with a feed consisting of air and water. Over the inlet a thread grid (mesh) was placed in a distance 600 mm from the inlet. Two types of scrubbers were used, namely one with an inlet and fluid way according to the present invention and one with the conventional vane inlet of the prior art construction. The scrubbers were identical in other respects. The results of the experiment are given in the graphical illustrations of FIGS. 2 and 3, respectively. GLF represents gas load factor=v·(density gas/density liquid−density gas). As can be seen from the illustrations, a significantly lower liquid entrainment resulted with the scrubber according to the present invention compared to the scrubber with the prior art vane inlet. The scrubber with the inlet and fluid way according to the present invention resulted in about 50 to 75% reduced liquid ratio downstream of the fluid way.

The invention claimed is:

1. A scrubber for separating constituents including a liquid phase from a substantially gaseous fluid flow comprising:
   a standing vessel having a substantially round cross section, an inner wall, a lower liquid outlet and an upper gas outlet;
   a fluid inlet directing fluid introduced into the standing vessel along the inner wall; and
   a fluid way that is arranged as a downward directed spiral along the inner wall of the standing vessel, that extends from the vicinity of the fluid inlet to the vicinity of the liquid outlet, and that has an opening allowing gas to escape inward to a central region of the standing vessel, such that all fluid introduced into the fluid way is passed down the full length of the fluid way, except the escaped gas, wherein the fluid way comprises a spiral-shaped pipe placed within the standing vessel, and the spiral-shaped pipe is oriented in direct elongation from a tangential inlet, extends to just above the liquid outlet, and has at least one opening for gas escape.

2. The scrubber according to claim 1, in which:

the fluid way is shaped as a guiding plate that spirals downward on the inner wall of the standing vessel; and the guiding plate extends towards a central axis of the standing vessel and has a width in a range of 5% to 20% of an inner diameter of the standing vessel and, along the innermost portion of the guiding plate, that is, the portion closest to the central axis of the standing vessel, has an upwards extending edge of a height in a range of 75-150% of the width of the guiding plate.

3. The scrubber according to claim 1, in which:

the standing vessel is shaped as a truncated cone; and the fluid way is in the form of a longitudinal, spiral-wound open pipe adapted to the shape of the standing vessel.

4. The scrubber according to claim 1, further comprising a vortex breaker arranged above the upper gas outlet of the standing vessel.

5. The scrubber as in claim 1, in which the fluid inlet slopes downward along the inner wall of the standing vessel.

6. The scrubber according to claim 5, in which the fluid way has a downwardly increasing opening for gas escape.

7. The scrubber according to claim 1, further comprising equipment for demisting arranged between the fluid inlet and the upper gas outlet and equipment for vortex breaking arranged between a lower end of the fluid way and the liquid outlet.

8. The scrubber according to claim 1, in which the fluid way is completely closed for gas escape at the fluid inlet, but becomes gradually open for escape of gas towards the liquid outlet, and the fluid way has about 5 revolutions in total.

9. The scrubber as in claim 1, in which the fluid inlet is oriented so as to be tangential to the inner wall of the standing vessel.

10. The scrubber according to claim 5, in which the downward slope of the fluid way increases.

11. The scrubber as in claim 1, in which the fluid inlet is provided with a deflection plate for fluid introduced into the standing vessel.

12. The scrubber as in claim 1, in which the at least one opening in the spiral-shaped pipe is a slit extending over the length of the pipe.

13. The scrubber as in claim 1, in which the at least one opening in the spiral-shaped pipe comprises a plurality of openings over the length of the pipe.

14. A scrubber for separating constituents including a liquid phase from a substantially gaseous fluid flow comprising:

a standing vessel having a substantially round cross section, an inner wall, a lower liquid outlet and an upper gas outlet;

a fluid inlet directing fluid introduced into the standing vessel along the inner wall; and a fluid way that is arranged as a downward directed spiral along the inner wall of the standing vessel, that extends from the vicinity of the fluid inlet to the vicinity of the liquid outlet, and that has an opening allowing gas to escape inward to a central region of the standing vessel, such that all fluid introduced into the fluid way is passed down the full length of the fluid way, except the escaped gas, wherein:

the fluid inlet is provided with a deflection plate for fluid introduced into the standing vessel;

the fluid way is a guiding plate that spirals downward on the inner wall of the standing vessel from the top of the standing vessel from an upper level slightly above an inlet centered on the deflection plate to a lower level slightly above the liquid phase located in the bottom of the standing vessel; and the guiding plate has uniform downward slope, extends 10% of an inner diameter of the standing vessel from the inner wall, and has, along the innermost portion of the guiding plate, that is, the portion closest to a central axis of the standing vessel, an upwards extending edge with a height equal to a width of the guiding plate.

15. A scrubber for separating constituents including a liquid phase from a substantially gaseous fluid flow comprising:

a standing vessel having a substantially round cross section, an inner wall, a lower liquid outlet and an upper gas outlet;

a fluid inlet directing fluid introduced into the standing vessel along the inner wall; and a fluid way that is arranged as a downward directed spiral along the inner wall of the standing vessel, that extends from the vicinity of the fluid inlet to the vicinity of the liquid outlet, and that has an opening allowing gas to escape inward to a central region of the standing vessel, such that all fluid introduced into the fluid way is passed down the full length of the fluid way, except the escaped gas, wherein the fluid inlet slopes downward along the inner wall of the standing vessel, and the fluid way has a downwardly increasing opening for gas escape.

* * * * *